United States Patent
Singh et al.

(10) Patent No.: US 12,321,673 B2
(45) Date of Patent: Jun. 3, 2025

(54) DESIGNING SERVICE FOR WELLBORES WITH FLUID LOSSES

(71) Applicant: Halliburton Energy Services, Inc., Houston, TX (US)

(72) Inventors: John Paul Bir Singh, Kingwood, TX (US); Siva Rama Krishna Jandhyala, Houston, TX (US); Krishna Babu Yerubandi, Houston, TX (US); Ronnie Glen Morgan, Duncan, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 669 days.

(21) Appl. No.: 17/551,881

(22) Filed: Dec. 15, 2021

(65) Prior Publication Data

US 2023/0186002 A1    Jun. 15, 2023

(51) Int. Cl.
*G06F 30/28* (2020.01)
*E21B 33/138* (2006.01)
*E21B 49/00* (2006.01)
*G06F 113/08* (2020.01)

(52) U.S. Cl.
CPC ............ *G06F 30/28* (2020.01); *E21B 33/138* (2013.01); *E21B 49/00* (2013.01); *E21B 2200/20* (2020.05); *G06F 2113/08* (2020.01)

(58) Field of Classification Search
CPC .... G06F 30/28; G06F 2113/08; E21B 33/138; E21B 49/00; E21B 2200/20; E21B 47/005; E21B 47/04; E21B 47/10
See application file for complete search history.

(56) References Cited

U.S. PATENT DOCUMENTS

| | | | |
|---|---|---|---|
| 2009/0188718 A1* | 7/2009 | Kaageson-Loe | E21B 21/003 175/57 |
| 2014/0190696 A1* | 7/2014 | Iverson | C04B 24/003 106/676 |
| 2016/0341031 A1* | 11/2016 | Yerubandi | E21B 33/13 |
| 2018/0201824 A1* | 7/2018 | Rodrigues | C09K 8/487 |
| 2019/0367797 A1 | 12/2019 | Morgan et al. | |
| 2020/0332172 A1 | 10/2020 | Pisklak et al. | |
| 2020/0333318 A1 | 10/2020 | Benkley et al. | |

(Continued)

OTHER PUBLICATIONS

Journal of Intelligent Materials, Systems and Structures. vol. 10, No. 8, pp. 601-608, 1999, Available at https://journals.sagepub.com/toc/jim/10/8, Accessed Dec. 15, 2021.

(Continued)

*Primary Examiner* — Natalie Huls
*Assistant Examiner* — Michael J Singletary
(74) *Attorney, Agent, or Firm* — Thomas Rooney; C. Tumey Law Group PLLC (57) ABSTRACT

Methods and systems are provided for designing and determining a well service in the presence of loss, including the volume, rates, and duration of pumping of fluids in the presence of losses. A method of designing services for wellbores includes calibrating a loss circulation model with input comprising wellbore state to update the loss circulation model with formation loss zone characteristics; applying the loss circulation model to output at least a prediction of loss rate; and designing a wellbore service at least partially based on the prediction of the loss rate.

17 Claims, 4 Drawing Sheets

(56) References Cited

U.S. PATENT DOCUMENTS

| | | |
|---|---|---|
| 2020/0369942 A1 | 11/2020 | Singh et al. |
| 2021/0147305 A1 | 5/2021 | Singh et al. |
| 2021/0147742 A1 | 5/2021 | Pearl, Jr. et al. |
| 2021/0150104 A1 | 5/2021 | Singh et al. |
| 2021/0151133 A1 | 5/2021 | Singh et al. |
| 2021/0171405 A1 | 6/2021 | Singh et al. |
| 2021/0171406 A1 | 6/2021 | Singh et al. |
| 2021/0171407 A1 | 6/2021 | Singh et al. |
| 2021/0171408 A1 | 6/2021 | Singh et al. |
| 2021/0172280 A1 | 6/2021 | Singh et al. |
| 2021/0207470 A1 | 7/2021 | Pisklak et al. |

OTHER PUBLICATIONS

Majidi, R., Miska, S. Z., Thompson, L. G., & Yu, M. (2008). Quantitative Analysis of Mud Losses in Naturally Fractured Reservoirs: The Effect of Rheology. SPE Western Regional and Pacific Section AAPG Joint Meeting. SPE 114130.

Alberty, M. W., & McLean, M. R. (2004). A Physical Model for Stress Cages. SPE Annual Technical Conference and Exhibition. SPE 90493.

\* cited by examiner

DESIGNING SERVICE FOR WELLBORES WITH FLUID LOSSES

BACKGROUND

In the oil and gas industry, a common problem in drilling wells or boreholes in subterranean formations is the loss of circulation (of fluids, such as drilling fluids, muds, or spacers in cementing operations) in a well or borehole during events like drilling, circulation, cementing etc. Such lost fluids typically go into fractures induced by excessive mud pressures, into pre-existing natural fractures, or into large openings with structural strength in the formation.

Designing services for cementing while wellbore fluid losses are being observed is generally accomplished with a focus on choosing lost circulation materials (LCM's) and the corresponding concentration for controlling the fluid loss rate. Currently, the design tools used by engineers and formation scientists do not account for rheology and density of the wellbore fluids in a systematic way. Generally, for cementing, the determination of fluid volumes of spacers and cements to be pumped is an additional design factor that may be determined heuristically and may be based on offset well knowledge.

Moreover, for effective displacement, the spacer fluids may require certain characteristics. For example, the spacer fluid may be compatible with the displaced fluid and the cement composition. Rheology of the spacer fluid may also be important. A number of different rheological properties may be important in the design of a spacer fluid, including yield point, plastic viscosity, gel strength, shear stress, inter alia. As a result, conventional spacer fluids may not provide the desired displacement in some instances.

BRIEF DESCRIPTION OF THE DRAWINGS

These drawings illustrate certain aspects of some of the embodiments of the present disclosure and should not be used to limit or define the disclosure.

DETAILED DESCRIPTION

Techniques of the present disclosure generally relate to wellbore servicing and, more particularly, embodiments relate to methods and systems for designing and determining a well service in the presence of loss, including the volume, rates, and duration of pumping of fluids in the presence of losses. While the present techniques may be particularly suited for wellbore cementing and design of corresponding spacer fluids and cement compositions, embodiments can be used to design any of a variety of fluids used in wellbore servicing, including cement compositions, spacer fluids, drilling fluids, wellbore flushes, and displacement fluids, among others. The fluid design includes composition and properties, such as water-to-solids ratio, fluid loss, free water, pumping time, density, and rheology, as well as fluid volume for the wellbore service. As disclosed herein, rheology may be defined as, but may not be limited to, a mathematical function that correlates shear stress to shear rate.

As previously mentioned, current fluid design for loss circulation control focuses on appropriate selection of the type and concentration of lost circulations materials (LCM's) to control the fluid loss rate. However, the current fluid design techniques do not take into rheology and density of the servicing fluids. The present disclosure implements a model-based methods and systems for determining the effect of rheology and density of wellbore servicing fluids on the loss rate, in accordance with one or more embodiments. For example, this method may enable wellbore fluid design for specific rheological properties, such as yield stress and shear thinning behavior, along with appropriate density. The lost circulation model disclosed may simulate various loss mechanisms, such as natural fractures, induced fractures, and highly permeable zones in the wellbore. Based on the loss mechanism and additional factures, such as wellbore state, wellbore geometry, and fluid properties, fluid loss rate under downhole pressure conditions may be determined. This may enable various scenarios of available fluid solutions to be evaluated for selection of an appropriate fluid design. For example, the lost circulation model enables the design engineer to determine the amount of wellbore servicing fluid will be lost, for example, into the fractures and pore throats while LCM particles may be stacked in order to minimize or eliminate the losses after sufficient delivery of LCM particles. Hence, the loss volume of wellbore servicing fluids may be coupled with the remaining annular volumes required to achieve a desired fluid function, such as effective displacements and desired top of fluids.

The lost circulation model disclosed herein considers a number of factors that contribute to lost circulation or what be called circulation losses. As disclosed herein, the lost circulation model is defined as a mathematical model that defines fluid volume lost or losses as a function of formation properties, such as, but not limited to, permeability, grain size, porosity, pore throats, fracture size and width (induced or natural), as well as a function of pumping rate, wellbore temperature, wellbore pressure, pore pressure, wellbore geometry; density, rheology, and flow rate of wellbore fluids; and density, rheology, and flow rate of reservoir fluids. In example embodiments, the lost circulation model disclosed herein utilizes loss mechanisms and fracture characteristics, such as fracture width, height, orientation, permeability of the formation, and the like. In addition, the lost circulation model may further utilize fluid characteristics, such as fluid rheology and density. Even further, the lost circulation model may further utilize a loss rate function, such as an exponential loss module. An example of an exponential loss model may begin with an initial maximum fluid loss into a given fracture or pore throat, then exponentially, as a function of time, decline to a minimum level of fluid loss or a zero level of fluid loss. Other loss rate functions may have a constant value, linear increase, or linear decrease, as may be appropriate for a particular application.

The lost circulation model can be used to assist in fluid design, including loss prediction and predicting fluid volumes. By prediction of loss, the fluid properties input to the model can be changed to analyze various scenarios. For example, the density and rheology, among other fluid properties, input into the model can be changed to analyze their impact on fluid loss. In addition, the flow rates of the wellbore servicing fluid being pumped into the wellbore that are input into the model can also be changed. With the model outputting the fluid loss for these various modelled scenarios, an appropriate fluid design can be selected to provide an acceptable fluid loss.

The lost circulation model may determine the fluid volume for the wellbore service. The fluid volume determined by the lost circulation model may be considered the estimated volume of the wellbore servicing fluid to be pumped for the particular wellbore service, wherein the fluid volume may include fluid lost into the formation, as well as fluid that may continue into the wellbore. The fluid volume may be determined, for example, such that wellbore servicing fluid can perform its intended function. If the fluid volume is too small and too much fluid is lost to the formation, then the wellbore servicing fluid may not be able to perform its function. Accordingly, the lost circulation model can be used to enable illustration of the fluid consumption in wellbore service. For a spacer fluid in a cementing operation, the model may provide a fluid volume to perform its intended function, including, the spacer volume required to transport and deposit LCMs; the spacer volume required to ensure effective mud solids and filter cake removal inside casing and liner walls; the spacer volume required to ensure annular hole cleaning; and/or the spacer volume required to ensure effective fluid displacement. Spacer fluids designed to be pumped between cement and the drilling fluid and can be compatible with both. One function of a spacer fluid is to provide hole cleaning by displacing the drilling fluid out of the wellbore so as to minimize any contamination of cement composition by the drilling fluid. Another function of spacer fluids is to provide scrubbing of the wellbore due to the presence of rugged particles in the formulation. In some applications such as for oil-based drilling fluid, another function of spacer is to invert the emulsified drilling fluid by utilizing appropriate surfactant package. Generally, embodiments may include a train of fluids might be pumped between the drilling fluid and cement composition, such as a flush and a spacer fluid. An example function of flush is generally to dilute the drilling fluid in the wellbore. For the spacer fluid to provide these desired functionalities, an appropriate spacer volume must be used. If the spacer volume is too small, the spacer fluid may intermix with the drilling fluid and, thus, may not prevent drilling fluid contamination of the cement composition. Also, small spacer volumes will provide insufficient scrubbing of the wellbore walls and will be unable to provide appropriate hole cleaning. For oil-based muds, insufficient spacer volumes will be unable to invert the muds which in turn may contaminate the cement and result in insufficient zonal isolation. Thus, by use of the loss circulation model to determine fluid volume an appropriate volume of the spacer (or other wellbore servicing) fluid may be used.

In some embodiments, the loss circulation model may determine the fluid volume required for a successful cementing operation, such as the volume of spacer fluid to reach a preselected top of fluid in the wellbore or a volume of cement composition to reach a preselected top of cement in the wellbore that includes reaching the desired top of cement by coupling with an appropriate wellbore fluid. The top of fluid, such as top of cement, may be defined as the highest depth of the wellbore servicing fluid (e.g., cement composition) in a wellbore after the wellbore service. For example, the top of cement is defined as the top of the set cement column in the wellbore anulus after well cement. In cementing, the top of cement can be an important factor in the cementing operation, for example, to have proper zonal isolation. Generally, top of cement may be determined from logging. Although cementing engineers may calculate the expected top of cement before pumping, unanticipated washouts or losses to the formation may affect the final height of the cement column. Thus, application of the lost circulation model can enable estimation of a fluid volume that can provide the preselected top of fluid in accordance with one or more embodiments.

For determination of top of fluid, the lost circulation may be combined with a wellbore fluid hydraulics simulator. The wellbore fluid hydraulics simulator utilizes inputs including formation properties, such as, but not limited to, permeability, grain size, porosity, pore throats, fracture size and width (induced or natural), pumping rate, reservoir temperature, reservoir pressure, pore pressure, wellbore geometry, fluid-fluid interfaces; density, rheology, and flow rate of wellbore fluids; and density, rheology, and flow rate of reservoir fluids to estimate a first output of wellbore pressure and wellbore temperature at the lost circulation zone and a second output of the location of the wellbore fluids at a given time. The lost circulation model and the fluid hydraulics simulator are combined by balancing the equations of motion and mass balance to estimate the amount of fluid loss at the lost circulation zone.

Figures 1, 2A:
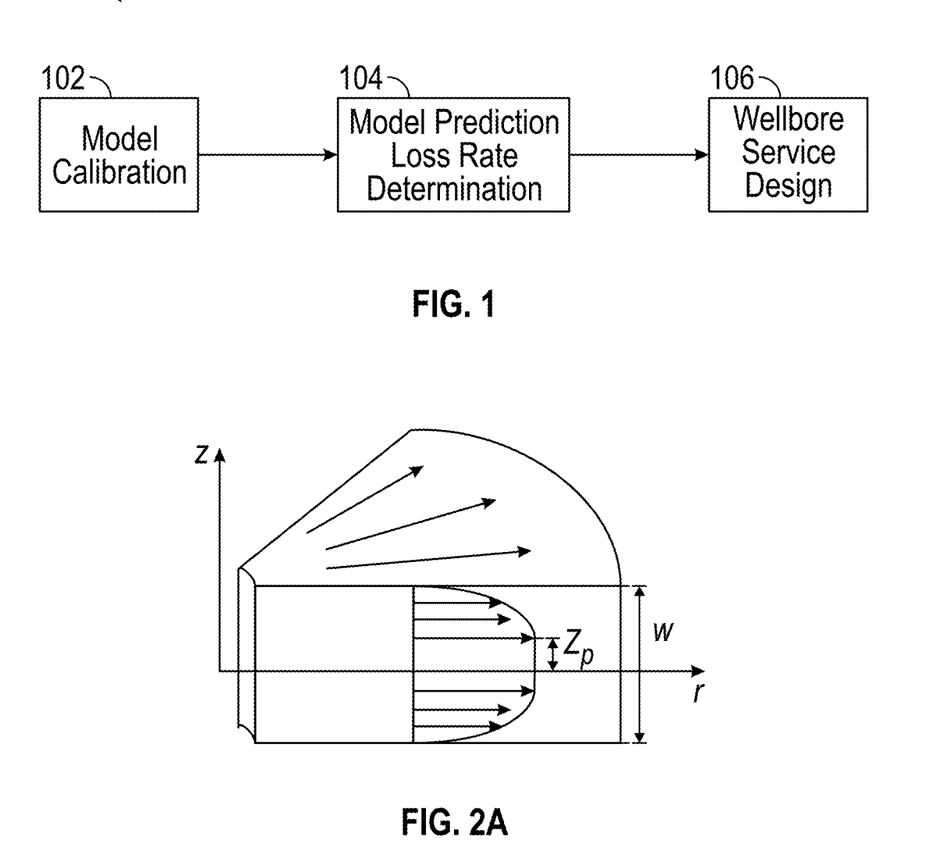
FIG. 1 illustrates an operative flow chart for designing fluid volumes for wellbore cementing in the presence of fluid losses in accordance with embodiments of the present disclosure.
FIGS. 2A and 2B illustrate a geometric shape of a natural fracture, in accordance with embodiments of the present disclosure.

In particular, the models disclosed herein may include two modes, wherein one mode may be calibration and the other mode may be prediction. FIG. 1 illustrates an operative flow chart for designing fluid volumes for wellbore cementing in the presence of fluid losses in accordance with embodiments of the present disclosure. As illustrated, FIG. 1 illustrates a method 100 that includes model calibration 102, model prediction 104, and wellbore service design 106. Model calibration 102 includes calibration of the lost circulation model to provide an output including fracture characteristics. The output from the model calibration 102 is input to model prediction 104 for loss rate determination. With the estimated loss rate from the model prediction 104, the next step of the method 100 includes wellbore service design 105, which can include, for example, fluid rheology, density, and fluid volume.

The model calibration 102 allows determination of unknown parameters (e.g., fracture parameters) under given conditions. In model calibration 102, the lost circulation model can receive inputs that include wellbore state. Wellbore state may include wellbore characteristics, such as wellbore geometry, wellbore conditions, and wellbore trajectory. Wellbore states may also include lost circulation information for prior-run fluids, such as historical loss rates (e.g., fluid volume loss) and corresponding fluid circulation rates. Historical loss rates may include fluid volume loss versus total measured depth (TMD) for the prior-run fluids. In some embodiments, the historical loss rate may include loss rate as a function of time and depth. This loss circulation information may be based on fluid loss from prior-run fluids for the same wellbore, such as drilling fluids or other pre-service circulation behavior. In addition to, or in alternative to, pre-service circulation behavior of the wellbore, loss circulation information may also be input for prior-run fluids introduced into offset wells. Properties of the prior-run fluids may also be input to the loss circulation model for model calibration 102. Example fluid properties include rheological properties, density, compressibility, and/or temperature dependent. Rheological properties may include, for example, yield point, plastic viscosity, shear thinning index for shear rate, shear stress index for shear stress, fluid gelation (gel strength), and/or thixotropic behavior.

Additional loss circulation information that may be input to the loss circulation model may include, for example, loss mechanisms. In general, there may be consider three type of loss mechanisms: natural fractures, induced fractures, and highly permeable zones. Natural fractures are openings which exists underground due to multiple reasons and may traverse the wellbore causing fluid loss. The natural fractures could be related, for example, to geomechanics (plate tectonics) or due to underground dissolution/erosion. Induced fractures are fractures traversing the wellbores that are induced by wellbore operations that include but not limited to: wellbore hydraulic friction combined with hydrostatic pressure exceeding the facture gradient of the reservoir; wellbore pressure spikes that occur during startups after drilling and/or circulation has been stopped; and the like. Highly permeable zones are formation zones traversed by the wellbore that are susceptible to loss of fluid. Typically, the determination of loss mechanism is based on the prior experience in the field coupled with the knowledge of the rock type in a formation. For example, carbonate-based rocks such as limestone are prone to react with underground water and form natural opening (fractures). Weak sandstone and depleted reservoirs may be prone to induced fracture. Depleted reservoir might also be highly permeable zones.

For the model calibration 102, the lost circulation model may output formation loss zone characteristics, which may include parameters of fractures and/or pore throats, for example. As disclosed herein, formation loss zone characteristics may include, but may not be limited to, permeability of the loss zone, pore throat size and distribution, tortuosity, porosity, the geometric characteristics, including, but not limited to, shape and geometric interconnectivity. Examples of formation zone loss characteristics that may be determined by the model calibration 102 may include fracture parameters, whether induced or natural fractures, such as opening dimensions (e.g., width, diameter, height), fracture width (e.g., slot width of modeled geometry), fracture connectivity, and/or fracture length. Some examples may include multiple fracture zones. Example of natural fracture geometry might be a zone represented as a completely circular disc opening with width and the depth as the fracture characteristics. Natural fracture may also be modeled as partial disc or a sector with additional fracture characteristic being the angle of the opening in the azimuthal direction; it may also be modeled as a pipe network with diameter and the distribution of diameter, connectivity, tortuosity as fracture characteristics. Example of induced fracture geometry might be a slot with parallel walls, with the width, depth, and the length along with wellbore as fracture characteristics; it may also be modeled as a slot with elliptical shape where the length of two axis (primary and secondary) and the length along with wellbore as the fracture characteristics. Examples of formation loss characteristics for highly permeable zones that may modelled as a number of disc-like openings in parallel be determined by the model calibration include number of parallel cells (e.g., where zone is modelled as a number of stacked cells), number of pipes in parallel (e.g., where zone is modelled as pipe or a pipe network).

The particular formation loss characteristics output depends, for example, on the loss mechanism and the available data. In some embodiments, one parameter of the fracture may be output, for example, where a single value of loss rate under given conditions of a pre-run fluid (e.g., drilling fluid) may be known. The actual inputs and outputs from model calibration 102 will also depend on the lost circulation model. For example, natural fractures may be modelled as a fracture in the shape of a disc. By using known data, the output from the model calibration 102 may include, for example, the width of the disc opening, thus providing a parameter of the fracture. By way of further example, an induced fracture may be modelled as a straight slot (e.g., approximation of wedge) with walls of the fracture parallel to each other of known depth and length along the wellbore. In this case, for example, the output from the model calibration 102 may include the size (width) of the slot, thus providing a parameter of the fracture. By way of further example, the highly permeable zone may be modeled as a number of stacked cells (e.g., discs), wherein the width of each cell being related to permeability. In this case, for example, the known permeability of the formation may be an input using which the modeled width of the each cell may be determined and, by using the width, the number of cells (discs) in parallel may be determined, for example, with additional input of loss circulation information. The relation between the permeability (K) and the width (w) may be written as:

$$w = 2\sqrt{3 * K} \qquad \text{Equation 1}$$

In some embodiments, model geometry may be different depending, for example, on each loss mechanism. For example, natural fractures may be modelled as a pipe opening. In that case, for example, the opening diameter of the pipe might be determined as an output from the model calibration 102. By way of further example, induced fracture may be modelled as an elliptical slot with opening size as an output from the model calibration 102. By way of further example, highly permeable formation zone may be modelled as a pipe or a pipe network with a known connectivity (e.g., tortuosity and hence permeability). In this case, for example, the number of pipes (or pipe network) in parallel may be determined as an output from the model calibration.

In some embodiments, loss circulation information input to the model calibration 102 may include time series of data for historical loss rate rather than a single data point of the historical loss rate. By way of example, the historical loss rate input to the model calibration 102 may include loss rate as a function of time and depth, which may be known from a prior-run fluid, such as drilling or other fluid circulation. With this data, additional loss circulation characteristics may be determined and output from the model calibration. For example, the natural fracture may be modelled as a network of pipes with pipe opening, pipe connectivity, length of the pipes, and like, as parameters which may be determined. In some embodiments, the lost circulation model may model multiple fractures in parallel. Similarly, more complex characterization of induced fracture and highly permeable zone may be made. When there is more data on loss rate as a function of time it might be possible to even determine the loss mechanism. Accordingly, inputting loss circulation information under given conditions, may help in determining all the loss mechanisms and their characteristics happening simultaneously.

In the illustrated embodiment, the formation loss characteristics output of the model calibration 102 is input to the model prediction 104 for loss rate determination for a particular wellbore service. For example, the loss rate may be determined as a function of time. The loss rate may further be determined as a function of wellbore conditions. Additional inputs may also be provided to the model prediction 104 in addition to the formation loss characteristics from the model calibration. Example inputs include the loss mechanism (more than one mechanism may be applicable for the given scenario), wellbore geometry, the outputs from hydraulic simulator which include temperature, pressure, and the wellbore fluid identity at the loss location as well as the wellbore fluid properties. Additional examples of such fluid properties of the one or more fluids that form the wellbore service, such as include fluid flow rates, densities, and rheologies. Additional inputs to the model prediction 104 can include the type of formation and its properties, such as mechanical properties, pre pressure, and geothermal gradient. For example, the properties may be provided for the spacer fluid and cement composition for the wellbore service. From these fluid properties, hydraulics calculations may be used to determine circulation pressure exerted on the loss zone mouth.

The loss circulation model used in the model prediction 104 may the same as the loss circulation model used in the model calibration 102. Output in model prediction 104 may include the loss rate. Loss rate may be output, for example, as a function of depth and/or time. In some embodiments, the circulation pressure in the wellbore at the loss zone location may be determined using hydraulic calculations before the loss rate is determined. The difference between circulation pressure and far field pore pressure is the differential pressure that acts as a driving force.

Depending on the loss mechanism, it may be possible to describe an otherwise tortuous loss zone with equivalent simplified geometries to get closed form solutions. However, it should be understood that a closed form solution is not required. In some examples disclosed herein, natural fluid losses may occur through a loss zone have natural fractures of disc-shaped geometry with a height along the wellbore. Similarly, in some examples disclosed herein, induced losses may occur through natural fracture of a slit geometry with a width and a height covering loss zone. These formation loss characteristics of fracture width and/or fracture height may be estimated in the model calibration 102 and then output to the model prediction 104 for loss rate determination. In some examples, the steady state loss rate equation connecting the differential pressure, fluid rheology, and characteristic dimensions with the loss rates may then be used for the loss rate calculation. Although geometric shapes are disclosed herein for the modeling of natural and induced fluid losses in the loss circulation model, other shapes may be utilized in the models disclosed herein.

Alternatively, in some embodiments, the prediction mode may be coupled with a wellbore fluid flow model. An appropriate mass balance may be applied on a lost circulation zone. In such embodiments, it may be possible to track the wellbore response in terms of rate, pressures, and fluid interfaces, simultaneously while pumping a fluid train, for example, during cementing and drilling completions. This may enable optimization of a plurality of aspects of cementing, including, but not limited to, fluid volumes, rheologies such as densities, and flow rates of various fluids that may be pumped to meet job objectives of zonal isolation and top of cement.

In some embodiments, the loss circulation model may include a hydraulics model or a more complex fluid displacement model. This may incorporate the concept of using analytical hydraulic models for determining fluid flow through fractures and pore throats to generate large amounts of physics-based data from which subsequent artificial intelligence models may be developed. As disclosed herein, the fluid flow model equations may be based on one specific fracture geometry. Alternatively, methods and systems disclosed herein may utilize other fracture geometries, including multiple fracture geometries, with associated characteristics.

The method 100 further includes wellbore service design 106. Wellbore service design 106 can include, for example, designing any number of different fluids, including a train of fluids, along with fluid density, fluid rheology, backpressure, flow rates, and volume of each fluid. In some embodiments, the wellbore service design 106 may include determination of the fluid volume for the wellbore service based on the loss rate from the model prediction 104. In other words, the fluid volume for the wellbore servicing fluids input into the model prediction may be determined once the loss rate is determined. The fluid volume may be determined, for example, such that wellbore servicing fluid can perform its intended function. If the fluid volume is too small and too much fluid is lost to the formation, then the wellbore servicing fluid may not be able to perform its function. Thus, by use of the loss circulation model for the model prediction 104 to determine fluid volume an appropriate volume of the spacer fluid (or other wellbore servicing fluid) may be used. In some embodiments, the loss circulation model may determine the fluid volume required for a successful cementing operation, such as the volume of spacer fluid to reach a preselected top of fluid in the wellbore or a volume of cement composition to reach a preselected top of cement in the wellbore that includes reaching the desired top of cement by coupling with an appropriate wellbore fluid. In some embodiments, the wellbore service design 106 may include repeating the model prediction for multiple different wellbore servicing fluids to find an acceptable fluid design with an acceptable loss rate.

An example lost circulation model that can be used for designing an optimized fluid volume for wellbore services in the presence of fluid loss, resulting from natural fractures, induced fractures, or highly permeable zones will now be discussed.

Figure 2B:
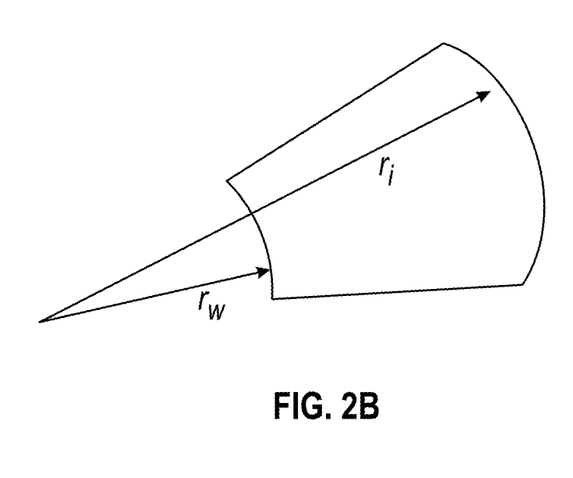

FIGS. 2A and 2B illustrates an assumed geometric shape of natural fractures that may be encountered in a wellbore. As discussed above, fluid may be lost into the natural fractures. In FIG. 2A, the width of the fracture is illustrated by width, w, and the depth of the opening in the radial direction is illustrated by radius, r. Also illustrated on FIG. 2A are the z-axis of the wellbore and the plug flow region $Z_p$ of fluid loss into the fracture In FIG. 2B, r, is the depth of the opening in the radial direction while $r_w$ is the radius of the wellbore.

The loss circulation model can determine loss rate using, for example, information on the natural fractures, such as shown in FIGS. 2A and 2B. As shown in FIGS. 2A and 2B, a natural fracture may be approximated as a geometry that expands from the wellbore into the formation all around in the theta direction. In a simplistic form, the fracture may be represented as a disc, but may also be represented by other geometric shapes, such as a sector of a disc, a slot, or a network of pipes, for example.

Below is an example equation that may be used to determine the loss rate ($\dot{Q}$) for natural fractures:

$\dot{Q}=f$(differential pressure,fracture geometry characteristics,rheology)   Equation 2

Below is another example equation that can be used to determine the loss rate ($\dot{Q}$) specifically for the disc-shaped geometry:

$$\dot{Q} = \frac{m\left(\frac{w}{2}\right)^{\frac{1}{m}}\left[\frac{4\pi m}{2m+1}\left(\frac{w}{2}\right)^2\right]}{\left[k\left(r_i^{1-m}-r_w^{1-m}\right)\right]^{\frac{1}{m}}} \left[\Delta p - \left(\frac{2m+1}{m+1}\right)\left(\frac{2\tau_y}{w}\right)(r_i - r_w)\right]^{\frac{1}{m}}[(1-$$   Equation 3 wherein $\tau = \tau_y + k\dot{\gamma}^m$   Equation 4 wherein $\Delta p$ is differential pressure between the fracture opening at the wellbore and the far end of the fracture which will be at the pore pressure; $\tau_y$ is the fluid's yield stress; w is the height of the loss zone along the wellbore (or the width of the fracture); m is the power law index of the Herschel-Bulkley fluid rheology model; $\dot{\gamma}$ is the shear rate; $r_i$ is a distance where in-situ pore pressure of the rock may be encountered, wherein the distance may be established based on recommendations from logging and engineering teams; $r_w$ is wellbore radius; and k is the consistency index of the Herschel-Bulkley fluid rheology model. While the preceding Equations 2 and 3 are based on the Herschel-Bulkley fluid rheology model, it should be understood that the loss circulation model for natural fractures is independent of the specific fluid model. For example, the loss circulation model may be used for fluids with shear-dependent viscosity which may be described by Newtonian, power law, Cross law, Carreau law, generalized Herschel Bulkley model, or generalized Newtonian fluid rheology models. These various models have different but similar mathematical functions that describe the fluid's shear stress vs shear rate response in viscometric geometries. Approaches may also be applied to thixotropic fluids and viscoelastic fluids.

Figure 3A:
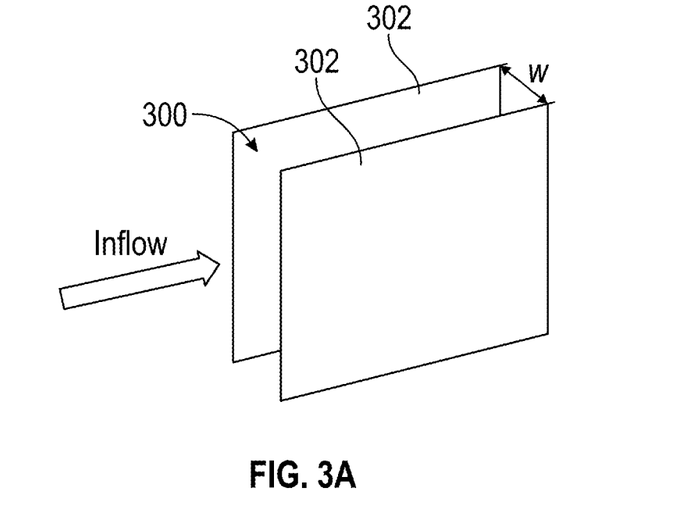
FIGS. 3A and 3B illustrate a geometric shape of an induced fracture in accordance with embodiments of the present disclosure.
Figure 3B:
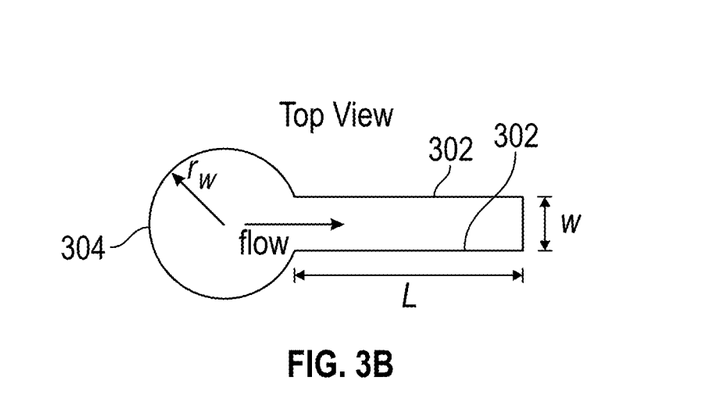

The loss circulation model can also be used to determine the loss rate for induced fractures. Any suitable geometry can be used to model the induced fractures, including, but not limited to: narrow slits; irregular fractures; groups of tubes; and the like. FIGS. 3A and 3B illustrate an assumed geometric shape for induced fractures. As illustrated, the induced fracture may be modeled as a slot 300 with parallel walls 302, wherein the width (w) is the distance between the parallel walls 302. The width (w) generally corresponds to the width of the fracture opening at the wellbore 304. The slot 300 may also be defined to have a length (L). As further illustrated, fluid will be lost from the wellbore 304 into the slot 300. The wellbore 304 can be defined to have a radius ($r_w$).

Below is an example equation that may be used to determine the loss rate ($\dot{Q}$) for induced fractures:

$\dot{Q}=f$(differential pressure,fracture characteristics,rheology)   Equation 5

The following are additional example equations that may be used to loss rate ($\dot{Q}$) for induced fractures modeled as a slot with parallel walls for fracture (e.g., as shown on FIGS. 3A and 3B), covering a loss zone of length h along the wellbore:

$$\dot{Q} = \left(\frac{hw^2}{2}\right)\left(\frac{p'w}{2k}\right)^{\frac{1}{m}}\frac{m}{2m+1}(1-z_p)^{\frac{m+1}{m}}\left(1+\frac{m}{m+1}z_p\right) \text{ wherein}$$   Equation 6

$$z_p = \frac{2\tau_y}{p'w} \text{ wherein}$$   Equation 7

$$p' = \frac{\Delta p}{r_i - r_w}$$   Equation 8 wherein h is length of fracture opening along the wellbore; w is the distance between parallel plates; p' is pressure gradient in the fracture; m is the power law index of the Herschel-Bulkley fluid, $Z_p$ is dimensionless quantity; $\tau_y$ is the yield stress of the fluid; $r_i$ is far end of the fracture where pressure is equal to the undisturbed pore pressure of the formation; $r_w$ is wellbore radius. The dimensionless quantity (Z) can be calculated, for example, from the Herschel-Bulkley parameters, pressure gradient and fracture width (w). By virtue of induced fractures being symmetric along a minimum horizontal stress axis, this equation represents loss rate through one half of the loss zone. While the preceding Equations 5 to 7 are based on the Herschel-Bulkley fluid rheology model, it should be understood that the loss circulation model for induced fractures is independent of the specific fluid model. For example, the loss circulation model may be used for fluids with shear-dependent viscosity which may be described by Newtonian, power law, Cross law, Carreau law, generalized Herschel Bulkley model, or generalized Newtonian fluid rheology models. These various models have different but similar mathematical functions that describe the fluid's shear stress vs shear rate response in viscometric geometries. Approaches may also be applied to thixotropic fluids.

Figure 4:
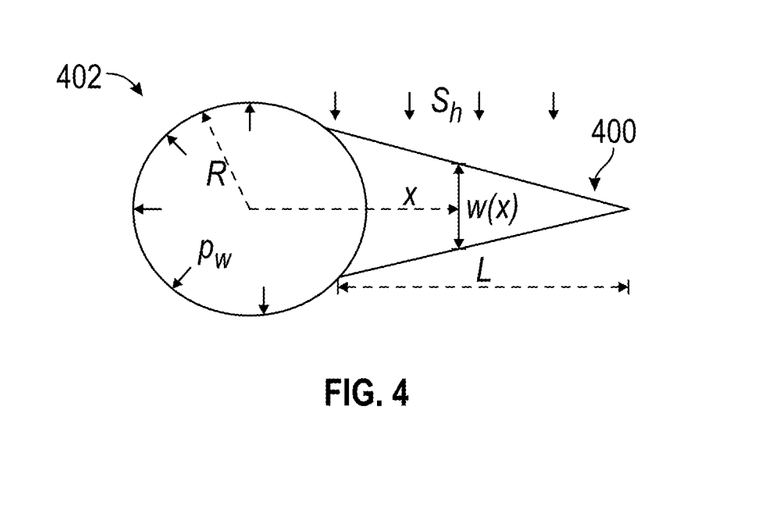
FIG. 4 illustrates another geometric shape of an induced fracture, in accordance with embodiments of the present disclosure.

Alternatively, in some examples, the size of induced fractures may be governed by geo-mechanical equations connecting rock mechanical properties, circulation pressure, and rock in-situ stress. FIG. 4 is a schematic of an induced fracture in accordance with one or more embodiments. As illustrated, the fracture 400 may have a width of w(x) that is a function of the distance (x) from the center of the wellbore 402. As further illustrated, L is the length of the fracture 400 and R is the radius of the wellbore 402. FIG. 4 also shows the minimum horizontal stress in rock as $S_h$ and the wellbore pressure as $p_w$. Below is an example equation that may be used in determining size of induced fractures, for example, with the model of FIG. 4:

$$w(x) = \frac{4(1-v^2)}{E}(p_w - S_h)\sqrt{(L+R)^2 - x^2}$$   Equation 9 wherein $S_h$ is the minimum horizontal stress in rock; $p_w$ is wellbore pressure; E is young's modulus of the formation rock; $v$ is the Poisson's ratio of the formation rock; $L=r_i-r_w$, the length of the fracture; and R is the radius of the wellbore.

In some embodiments, the dimensions of the induced fracture may vary over time. For example, coupling geomechanics and hydraulics may result in a scenario wherein the characteristic dimensions of the induced fracture may depend on the state of the wellbore at any given time. In particular, width of the fracture depends on the pressure in the wellbore at the loss location which is a function of the fluids positions, their properties and flow rates for a given wellbore geometry.

In addition to natural and induced fractures, highly permeable zones are another fluid loss mechanism that may be included in the loss circulation model. Any suitable geometry can be used to model highly permeable zones. In general, in some embodiments, the loss rate for highly permeable fractures can be modelled as a function of pressure drop, rheology, geometric parameters of the well and the characteristic shape factors of loss zone as follows:

$$\dot{Q} = f(\Delta p, GHB \text{ parameters}, r_w, \text{radial extent of loss zone}, \text{pore pressure}) \quad \text{Equation 10}$$

In some embodiments, highly permeable zones may be modeled as a stack of discs. For example, the width, w, of each disc in the stack may be given by:

$$w = 2\sqrt{3 * K} \quad \text{Equation 10}$$

wherein K is the permeability of the zone and w is the width of the disc. An unknown for this model of a stack of discs may be the number of discs in accordance with highly permeable zones, the unknown is the number of discs in the stack. It should be noted that the term disc may be used interchangeably with the word disc and likewise the plural of such. This number may be determined using operational data in calibration mode, as disclosed herein. For example, the length of the highly permeable zone along the wellbore may be first be obtained such that the number, n, may be determined using n=(L/w), which might be converted to nearest integer. One of ordinary skill in the art should be able to estimate length of the highly permeable zone, for example, from depth at which losses occurred and changes of loss rate as drilling continued.

The above Equations 1-9 provide example equations that can be used for modelling loss rate. With a known loss rate, these equations may be used in the model calibration 102, for example, to determine formation loss characteristics. However, these example calculations are only representative. It is possible to use other models which may have multiple fracture characteristics representing more complex geometries to represent all three loss mechanisms. For example, the case of natural fracture may be modeled as a network of pipes intersecting the wellbore. In that case, distribution of pipe diameters, e.g., mean diameter and standard deviation, and connectivity of pipes as fracture characteristics, which may be determined using appropriate loss data. Depending on valid, simplified geometries for different loss mechanisms, other equations connecting loss rate to inputs may be derived. The exact form of the equations for modelling depends, for example, on the nature of losses (e.g., natural vs. induced vs. permeable zones etc.), the assumed shape for loss zone, and the type of rheology model used to describe the fluid being lost. Some example forms could be polynomial, exponential, transcendental etc. Further, a data-driven machine learning model like Neural Networks can be used in place of an analytical form. In some embodiments, a machine learning model may be trained on the calibration loss to capture the fracture characteristics. The examples shown above are used to illustrates the workflow and thus some specific shapes of loss zone are used with their corresponding analytical forms for loss rate versus pressure drop.

FIG. 4 illustrates a system 400 that may be used for preparation and delivery of a designed volume of a wellbore servicing fluid downhole, in accordance with embodiments of the present disclosure. It should be noted that while FIG. 4 generally depicts a land-based operation, those skilled in the art will readily recognize that the principles described herein are equally applicable to subsea operations that employ floating or sea-based platforms and rigs, without departing from the scope of the disclosure. As illustrated on FIG. 4, the system 400 may include a vessel 405 and a pump 410. The pump 410 may be positioned downstream of the vessel 405 and may be fluidly coupled to a tubular 415 that is in fluid communication with the wellbore 420. The tubular 415 may be configured to circulate or otherwise deliver the designed volume of spacer fluid to the wellbore 420. The tubular 415 may include, for example, of one or more different pipes that extend into the wellbore 420. The pump 410 may be, for example, one or more high pressure or low-pressure pumps, which may depend on, without limitation, the viscosity and density of the designed volume of spacer fluid. Without limitation, the pump 410 may draw the spacer fluid from the vessel 405, elevate the designed volume of spacer fluid to an appropriate pressure, and then introduce the designed volume of spacer fluid to the tubular 415 for delivery downhole. Without limitation, the vessel 405 and pump 410 may be disposed on one or more cement trucks, for example, for subsequent delivery of the composition to a wellbore in accordance with certain embodiments.

The wellbore servicing fluid (e.g., spacer fluid, cement composition, etc.) may be prepared and introduced into the wellbore. The preceding techniques may be used the design of the wellbore servicing fluid, for example, to select fluid volume, rheology, density, etc. In some embodiments, the fluid design may be updated in real time. For example, the loss circulation model may be used in real to update fluid volume requirements for a particular fluid based, for example, on actual losses being encountered and input into the model calibration 102 as loss circulation information, followed by the model prediction 104. In other embodiments, the fluid design (e.g., rheology, density) may be adjusted in real time based on the model calibration 102 and the model prediction 104 wherein actual losses input into the model calibration 102, for example, to account for losses while drilling with update of the drilling fluid design. While not illustrated, system 400 may further include a recirculating mixer, a batch mixer and/or a jet mixer, which may be used for example, in preparation and/or storage of the spacer fluid. Non-limiting additional components that may be present include, but are not limited to, supply hoppers, valves, condensers, adapters, joints, gauges, sensors, compressors, pressure controllers, pressure sensors, flow rate controllers, flow rate sensors, temperature sensors, and the like.

Alternatively, the system 400 may also include a computer (not shown) and may include any instrumentality or aggregate of instrumentalities operable to compute, estimate, classify, process, transmit, receive, retrieve, originate, switch, store, display, manifest, detect, record, reproduce, handle, or utilize any form of information, intelligence, or data for business, scientific, control, or other purposes. The computer may be any processor-driven device, such as, but not limited to, a personal computer, laptop computer, smartphone, tablet, handheld computer, dedicated processing device, and/or an array of computing devices. In addition to having a processor, the computer may include a server, a memory, input/output ("I/O") interface(s), and a network interface. The memory may be any computer-readable medium, coupled to the processor, such as RAM, ROM, and/or a removable storage device for storing data and a database management system ("DBMS") to facilitate management of data stored in memory and/or stored in separate databases. The computer may also include display devices such as a monitor featuring an operating system, media browser, and the ability to run one or more software applications. Additionally, the computer may include non-transitory computer-readable media. Non-transitory computer-readable media may include any instrumentality or aggregation of instrumentalities that may retain data and/or instructions for a period of time. The computer may utilize the inputs disclosed herein, along with the equations disclosed herein to form an algorithm or model for calculating and determining output disclosed herein, including the corresponding fluid loss rate. Further, the computer may utilize the calculated fluid loss rate in an equation, algorithm, or model to determine the appropriate fluid volume, including spacer fluid volume, for the required effective displacement, wherein the appropriate designed fluid volume may compensate for the calculated fluid loss rate.

Alternatively, in other embodiments, the system may be offsite (not shown). In general, the offsite system may include a computer, wherein inputs to the computer include wellbore geometry, wellbore fluid properties, fluid circulation rate and loss circulation rate of a fluid. The offsite system may further include a plurality of loss circulation models based on loss mechanisms, fracture characteristics, wellbore geometry, and wellbore fluid properties. The plurality of loss circulation models may determine a fluid loss rate and a designed volume of fluids, wherein the plurality of loss circulation models may include a natural fracture model, an induced fracture model, and a highly permeable zone model. Moreover, the plurality of loss circulation models may include a calibration mode and a prediction mode, for example, the model calibration 102 and the model prediction 104 shown on FIG. 1. Methods disclosed herein may include inputting, into a computer, wellbore geometry, wellbore fluid properties, fluid circulation rate, and total fluid loss for the model calibration 102. Methods may further include determining a loss rate under downhole pressure conditions with a loss circulation model based on loss mechanisms, fracture characteristics, wellbore geometry, and wellbore fluid properties in the model prediction 104. The plurality of loss circulation models may include a natural fracture model, an induced fracture model, and a highly permeable zone model. Methods may further include determining a designed volume of fluid based on the loss rate, for example, the wellbore service design 106 shown on FIG. 1. It should be noted that the total volume of fluid will be the combination of what is needed to allow for fluid losses into to the fractures, pores etc. of the formation or reservoir, as well as the amount of fluid volume needed (after losses) to accomplish the desired hole cleaning and/or fluid displacement.

Methods disclosed herein may include inputting, into a computer, wellbore geometry, wellbore fluid properties, fluid circulation rate and total fluid loss. Methods may further include determining a loss rate under downhole pressure conditions with a plurality of fluid design models based on loss mechanisms, fracture characteristics, wellbore geometry, and wellbore fluid properties. The plurality of loss circulation models may include a natural fracture model, an induced fracture model, and a highly permeable zone model. Moreover, the plurality of fluid design model may include a calibration mode and a prediction mode, for example, the model calibration 102 and the model prediction 104 shown on FIG. 1. The inputs in the calibration mode may include the loss mechanism, fluid rheology, and wellbore state, among others, and wherein the output may include the loss circulation characteristics. The inputs in the prediction mode may include the loss circulation characteristics and fluid properties, such as rheology, density, and flow rate, wherein the output may include the loss rate. Methods may further include determining a designed volume of fluid based on the loss rate.

Accordingly, the present disclosure may provide methods, systems, and apparatus that may relate to methods of designing optimized wellbore servicing fluids using a loss circulation model. The methods and systems may include any of the various features disclosed herein, including one or more of the following statements:

Statement 1. A method of designing services for wellbores, comprising: calibrating a loss circulation model with input comprising wellbore state to update the loss circulation model with formation loss zone characteristics; applying the loss circulation model to output at least a prediction of loss rate; and designing a wellbore service at least partially based on the prediction of the loss rate.

Statement 2. The method of statement 1, further comprising performing the wellbore service.

Statement 3. The method of statement 1 or 2, wherein the designing the wellbore service comprises determining a fluid volume, and wherein the method further comprising pumping the fluid volume into a wellbore.

Statement 4. The method of any preceding statement, wherein the designing the wellbore services comprises determining a volume of a cement composition and/or a volume of a spacer fluid.

Statement 5. The method of any preceding statement, wherein the wellbore state comprises at least one wellbore characteristic selected from the group consisting of wellbore geometry, a wellbore condition, and wellbore trajectory.

Statement 6. The method of any preceding statement, wherein the wellbore state comprises loss circulation information for a prior-run fluid, wherein the loss circulation information comprises a historical loss rate.

Statement 7. The method of statement 6, wherein the historical loss rate is a function if time and depth.

Statement 8. The method of any preceding statement, wherein the wellbore state comprises a loss mechanism.

Statement 9. The method of any preceding statement, wherein the formation loss zone characteristics comprise at least one formation loss zone characteristic selected from the group consisting of a fracture parameter, a pore throat parameter, permeability, tortuosity, porosity, and combinations thereof.

Statement 10. The method of any preceding statement, wherein the formation loss zone characteristics comprise at least one fracture parameter selected from the group consisting of fracture width, a fracture opening dimension, a fracture length, fracture connectivity, and combinations thereof.

Statement 11. The method of any preceding statement, wherein the loss circulation model utilizes an equation for determining loss rate ($\dot{Q}$) of the form of Equation 2.

Statement 12. The method of any preceding statement, wherein the loss circulation model assumes a fracture extending from a wellbore accepting loss of a fluid is a natural fracture, wherein the loss circulation model utilizes an equation for determining loss rate ($\dot{Q}$) of the form of Equation 3.

Statement 13. The method of any preceding statement, wherein the loss circulation model assumes a fracture extending from a wellbore accepting loss of a fluid is modeled as an induced fracture with parallel plates, and wherein the loss circulation model utilizes an equation for determining loss rate ($\dot{Q}$) of the form of Equation 6.

Statement 14. The method of any preceding statement, wherein the loss circulation model assumes a highly permeable zones is accepting loss of a fluid from a wellbore, the highly permeable zone being modeled as a stack of discs, wherein a width of each disc is given by Equation 10.

Statement 15. A method comprising: calibrating a loss circulation model with input comprising wellbore state to update the loss circulation model with formation loss zone characteristics, wherein the wellbore state comprises a wellbore characteristic and a historical loss rate for a prior-run fluid; applying the loss circulation model to output at least a prediction of loss rate of a fluid for a wellbore service, wherein one or more properties of the fluid are input to the loss circulation model; and determining a fluid volume for the fluid based on the loss rate.

Statement 16. The method of statement 15, further comprising preparing the fluid and introducing the fluid into a wellbore.

Statement 17. The method of statement 15 or 16, wherein the fluid comprises a cement composition or a spacer fluid.

Statement 18. The method of any one of statements 15 to 17, wherein the formation loss zone characteristics comprise at least one formation loss zone characteristic selected from the group consisting of a fracture parameter, a pore throat parameter, permeability, tortuosity, porosity, and combinations thereof.

Statement 19. The method of any one of statements 15 to 18, wherein the formation loss zone characteristics comprise at least one fracture parameter selected from the group consisting of fracture width, a fracture opening dimension, a fracture length, fracture connectivity, and combinations thereof.

Statement 20. The method of statement 15, wherein the formation loss zone characteristics comprise at least one characteristic of a permeable zone selected from the group consisting of a number of parallel cells and a number of pipes in parallel.

To facilitate a better understanding of the present invention, the following examples of certain aspects of some embodiments are given. In no way should the following examples be read to limit, or define, the entire scope of the disclosure.

EXAMPLE

The following example was performed to illustrate hypothetical modelling of loss rate ($\dot{Q}$). The following hypothetical inputs were used to the loss circulation model to demonstrate the effect of $\tau_y$ and k on loss rate:

$\Delta p$=500 psi;
$r_w$=6";
$r_i$=50×$r_w$;
h=10 ft;
m=1; and
w=750 microns for both natural and induced fractures.

Figure 5:
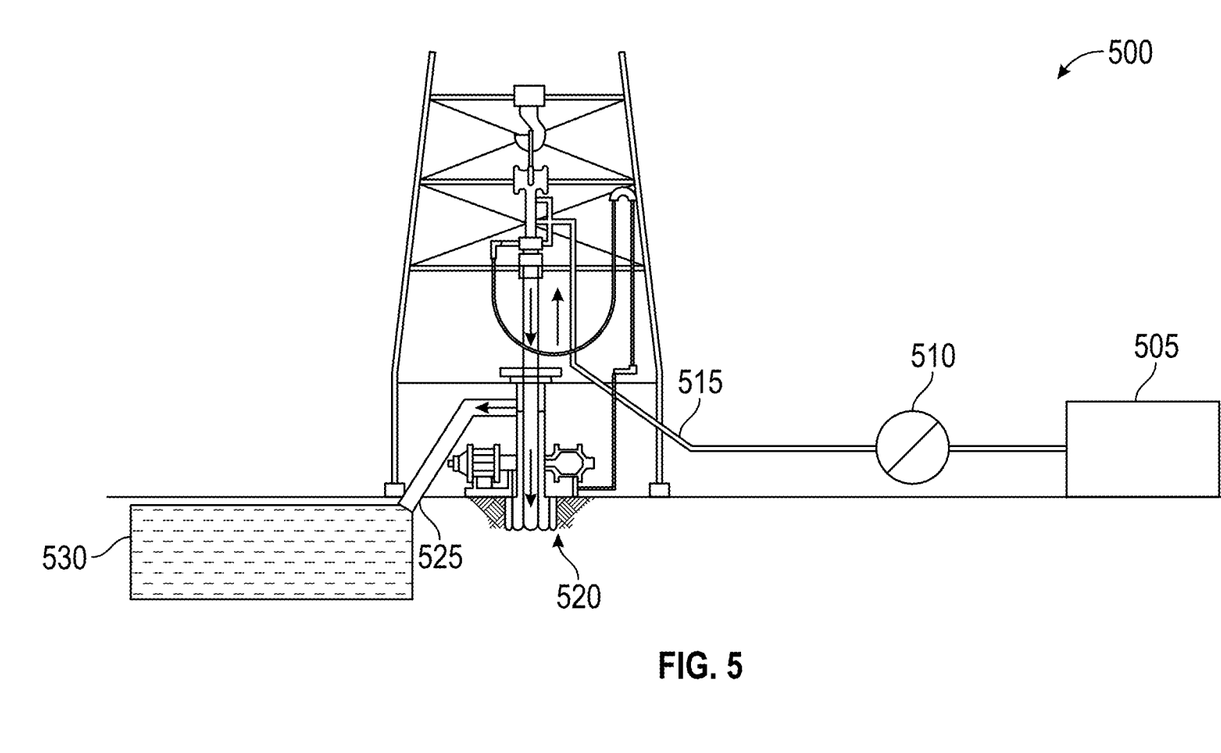
FIG. 5 illustrates an example system that may be used for preparation and delivery of a designed volume of spacer fluid downhole, in accordance with embodiments of the present disclosure.

Equation 3 was used to determine loss rate ($\dot{Q}$) for natural fractures. Equation 6 was used to determine loss rate ($\dot{Q}$) for induced fractures. The results of the modelling are provided in FIGS. 5 and 6. FIG. 5 is a contour plot of loss rate ($\dot{Q}$) as a function of Ty and k for losses through natural fractures and FIG. 6 is a contour plot of loss rate ($\dot{Q}$) as a function of Ty and k for losses through induced fractures.

Figure 6:
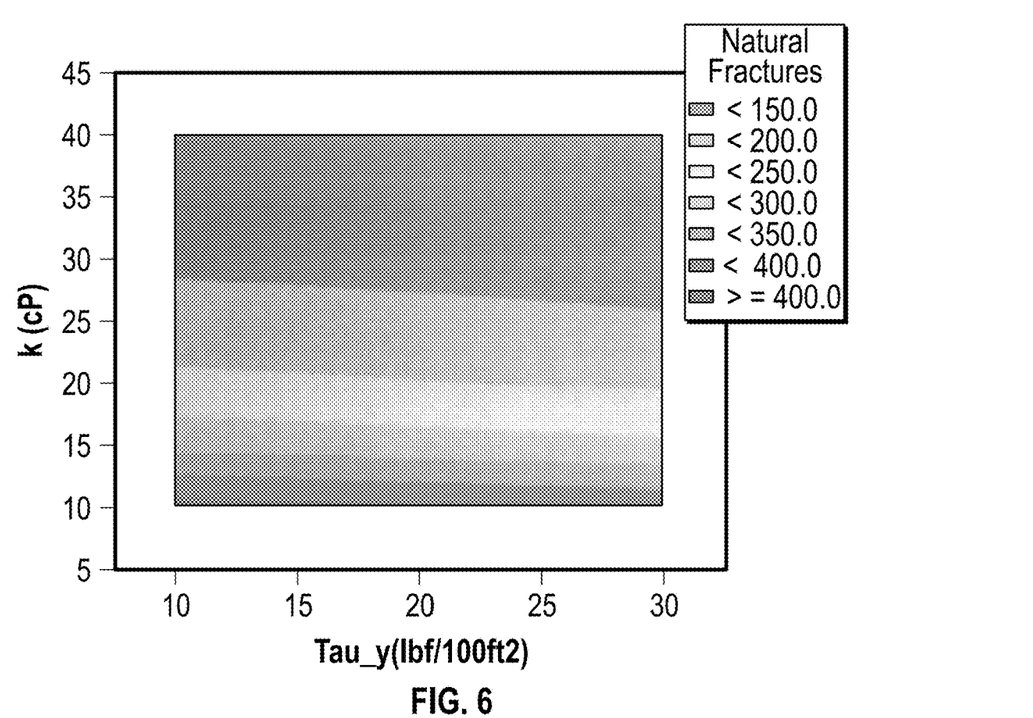
FIG. 6 is a contour plot of loss rate for fluid losses through natural fractures, in accordance with embodiments of the present disclosure.
Figure 7:
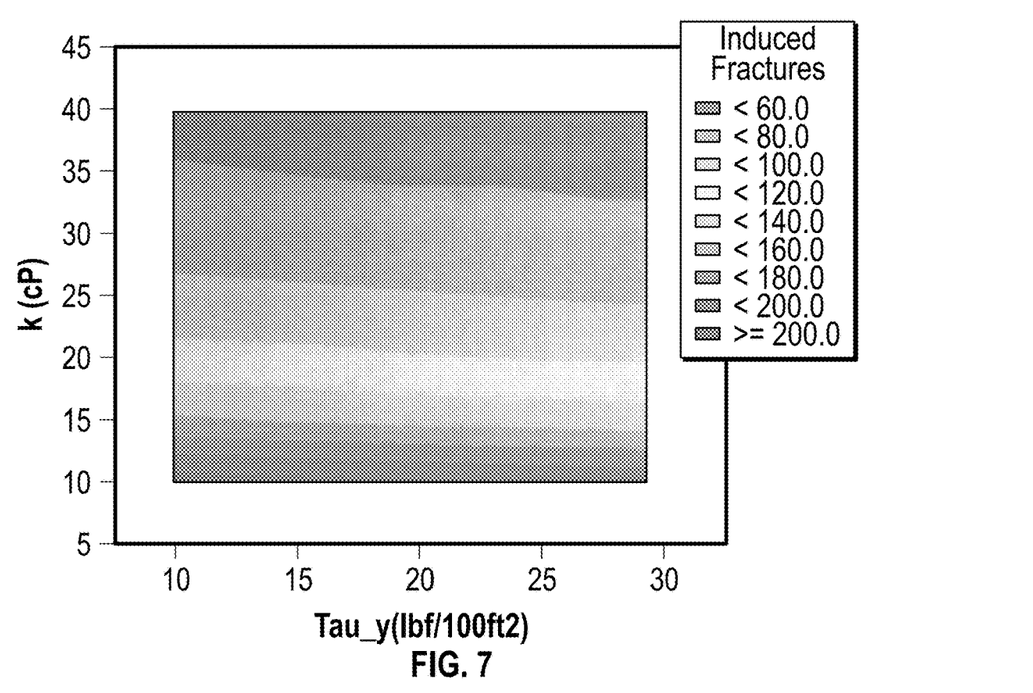
FIG. 7 is a contour plot of loss rate as a function for fluid losses through induced fractures, in accordance with embodiments of the present disclosure.

The contour plots depicted in FIGS. 5 and 6 demonstrate the effect of rheology parameters in regulating or increasing the loss rate ($\dot{Q}$) through a given characteristic size of a loss zone. The plurality of bands indicates loss rate ($\dot{Q}$) in barrels per hour (bph), thereby enabling the selection of the desired rheology requirements and fluid excess or total volume of fluid to meet the objective of TOC while abiding by placement constraints, such as pore pressure, fracture pressure, and the like. The effect of density is also a critical component, as the change in density may affect the hydrostatics, which, in turn, may change circulation pressure.

It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the elements that it introduces.

For the sake of brevity, only certain ranges are explicitly disclosed herein. However, ranges from any lower limit may be combined with any upper limit to recite a range not explicitly recited, as well as ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present embodiments are well adapted to attain the ends and advantages mentioned as well as those that are inherent therein. The particular embodiments disclosed above are illustrative only, as the present embodiments may be modified and practiced in different but equivalent manners. Although individual embodiments are discussed, all combinations of each embodiment are contemplated and covered by the disclosure. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative embodiments disclosed above may be altered or modified and all such variations are considered within the scope and spirit of the present disclosure. If there is any conflict in the usages of a word or term in this specification and one or more patent(s) or other documents that may be incorporated herein by reference, the definitions that are consistent with this specification should be adopted.

What is claimed is:

1. A method of designing services for wellbores, comprising:
    calibrating a loss circulation model with input comprising wellbore state to update the loss circulation model with formation loss zone characteristics;

applying the loss circulation model to output at least a prediction of loss rate wherein the loss circulation model utilizes model for determining loss rate ($\dot{Q}$) of the form;

$\dot{Q}$=f(differential pressure,fracture geometry characteristics,rheology,well geometry); and designing a wellbore service based on the prediction of the loss rate, wherein the wellbore service comprises a fluid train comprising a plurality of fluids;

preparing the fluid train; and introducing the fluid train into a wellbore.

2. The method of claim 1, wherein the designing the wellbore service comprises determining a fluid volume, and wherein the method further comprising pumping the fluid volume into a wellbore.

3. The method of claim 1, wherein the designing the wellbore services comprises determining a volume of a cement composition and/or a volume of a spacer fluid.

4. The method of claim 1, wherein the wellbore state comprises at least one wellbore characteristic selected from the group consisting of wellbore geometry, a wellbore condition, and wellbore trajectory.

5. The method of claim 1, wherein the wellbore state comprises loss circulation information for a prior-run fluid, wherein the loss circulation information comprises a historical loss rate.

6. The method of claim 5, wherein the historical loss rate is a function if time and depth.

7. The method of claim 1, wherein the wellbore state comprises a loss mechanism.

8. The method of claim 1, wherein the formation loss zone characteristics comprise at least one formation loss zone characteristic selected from the group consisting of a fracture parameter, a pore throat parameter, permeability, tortuosity, porosity, and combinations thereof.

9. The method of claim 1, wherein the formation loss zone characteristics comprise at least one fracture parameter selected from the group consisting of fracture width, a fracture opening dimension, a fracture length, fracture connectivity, and combinations thereof.

10. The method of claim 1, wherein the loss circulation model assumes a fracture extending from a wellbore accepting loss of a fluid is a natural fracture, wherein the loss circulation model utilizes an equation for determining loss rate ($\dot{Q}$) of the form:

$$\dot{Q} = \frac{\left[\Delta p - \left(\frac{2m+1}{m+1}\right)\left(\frac{2\tau_y}{w}\right)(r_i - r_w)\right]^{\frac{1}{m}} \left[(1-m)\left(\frac{w}{2}\right)\right]^{\frac{1}{m}} \left[\frac{4\pi m}{2m+1}\left(\frac{w}{2}\right)^2\right]}{\left[k(r_i^{1-m} - r_w^{1-m})\right]^{\frac{1}{m}}}$$

wherein $\tau = \tau_y + k\dot{\gamma}^m$; wherein $\Delta p$ is a differential pressure between a fracture opening at the wellbore and the far end of the fracture; $\tau_y$ is yield stress of the fluid; w is a width of the fracture; m is power law index of the Herschel-Bulkley fluid rheology model; $\dot{\gamma}$ is the shear rate of the fluid; $r_i$ is a distance where in-situ pore pressure of formation rock may be encountered; $r_w$ is wellbore radius; and k is the consistency index of the Herschel-Bulkley fluid rheology model.

11. The method of claim 1, wherein the loss circulation model assumes a fracture extending from a wellbore accepting loss of a fluid is modeled as an induced fracture with parallel plates, and wherein the loss circulation model utilizes an equation for determining loss rate ($\dot{Q}$) of the form:

$$\dot{Q} = \left(\frac{hw^2}{2}\right)\left(\frac{p'w}{2k}\right)^{\frac{1}{m}} \frac{m}{2m+1}(1-z_p)^{\frac{m+1}{m}}\left(1 + \frac{m}{m+1}\right)z_p$$

wherein $$z_p = \frac{2\tau_y}{p'w}; p' = \frac{\Delta p}{r_i - r_w};$$

h is length of fracture opening along the wellbore; w is distance between the parallel plates; p' is pressure gradient in the fracture; m is the power law index of the Herschel-Bulkley fluid, $Z_p$ is a dimensionless quantity; $\tau_y$ is the yield stress of the fluid; $r_i$ is far end of the fracture where pressure is equal to the undisturbed pore pressure of the formation; $r_w$ is wellbore radius.

12. The method of claim 1, wherein the loss circulation model assumes a highly permeable zones is accepting loss of a fluid from a wellbore, the highly permeable zone being modeled as a stack of discs, wherein a width of each disc is given by:

$$w = 2\sqrt{3*K}.$$

wherein K is a permeability of the highly permeable zone and w is the width.

13. A method comprising:

calibrating a loss circulation model with input comprising wellbore state to update the loss circulation model with formation loss zone characteristics, wherein the wellbore state comprises a wellbore characteristic and a historical loss rate for a prior-run fluid, and wherein the formation loss zone characteristics comprise at least one characteristic size and shape of the loss zone;

applying the loss circulation model to output at least a prediction of loss rate of a fluid for a wellbore service, wherein one or more properties of the fluid are input to the loss circulation model;

determining a fluid volume for the fluid based on the loss rate;

designing a wellbore service based on the prediction of the loss rate, wherein the wellbore service comprises a fluid train comprising a plurality of fluids;

preparing the fluid train; and introducing the fluid train into a wellbore.

14. The method of claim 13, wherein the fluid comprises a cement composition or a spacer fluid.

15. The method of claim 13, wherein the formation loss zone characteristics comprise at least one formation loss zone characteristic selected from the group consisting of a fracture parameter, a pore throat parameter, permeability, tortuosity, porosity, and combinations thereof.

16. The method of claim 13, wherein the formation loss zone characteristics comprise at least one fracture parameter selected from the group consisting of fracture width, a fracture opening dimension, a fracture length, fracture connectivity, and combinations thereof.

17. The method of claim 13, wherein the formation loss zone characteristics comprise at least one characteristic of a permeable zone selected from the group consisting of a number of parallel cells and a number of pipes in parallel.

* * * * *